United States Patent [19]
Shirai et al.

[11] Patent Number: 5,236,518
[45] Date of Patent: Aug. 17, 1993

[54] VARIABLE RELUCTANCE SENSOR WITH OFFSET MAGNETS HAVING IMPROVED MAGNETIC FLUX MEMBER

[75] Inventors: Takeshi Shirai, Pendleton, Ind.; Andrzej M. Pawlak, Troy, Mich.; Donald L. Richardson, Anderson, Ind.

[73] Assignee: General Motors Corporation, Detroit, Mich.

[21] Appl. No.: 836,634

[22] Filed: Feb. 14, 1992

Related U.S. Application Data

[63] Continuation-in-part of Ser. No. 756,707, Sep. 9, 1991, abandoned.

[51] Int. Cl.$^5$ .............................................. H01F 1/00
[52] U.S. Cl. ...................................... 148/122; 148/103
[58] Field of Search .......................... 148/122, 103, 121

[56] References Cited

U.S. PATENT DOCUMENTS

| | | | |
|---|---|---|---|
| 3,098,776 | 7/1963 | Elarde | 148/122 |
| 3,620,856 | 11/1971 | Hiraoka | 148/122 |
| 5,023,546 | 6/1991 | Pawlak et al. | 324/174 |
| 5,023,547 | 6/1991 | Pawlak et al. | 324/174 |

FOREIGN PATENT DOCUMENTS

| | | |
|---|---|---|
| 0431749 | 6/1991 | European Pat. Off. |
| 2924700 | 1/1981 | Fed. Rep. of Germany |
| 2112298 | 6/1972 | France |
| 2406876 | 5/1979 | France |

OTHER PUBLICATIONS

Harold E. McGannon, "The Making, Shaping and Treating of Steel", *United States Steel*, pp. 1123-1124, Ninth Edition, 1971.

*Primary Examiner*—John P. Sheehan
*Attorney, Agent, or Firm*—George A. Grove

[57] ABSTRACT

A means is provided for improving the magnetic permeability of a magnetic circuit within a variable reluctance sensor having off-set, permanent magnets by appropriately annealing the magnetic flux member. The annealing process includes heating the machined magnetic flux member in a vacuum to a temperature and for a duration sufficient to austenitize the magnetic steel so that full carbide solution is obtained, for example about 1300° F. to about 1550° F. for a duration of about 15 to 30 minutes. The magnetic flux member is then appropriately cooled in the vacuum so as to prevent the formation of martensite. The magnetic circuit, incorporating the annealed magnetic flux member, exhibited improved magnetic permeability, and the sensor signal was increased by as much as about 60 percent during operation. The method of this invention enhances the overall effectiveness of the sensor, particularly when sensing low rotational speeds such as when employed within automotive anti-lock braking or traction control systems.

7 Claims, 3 Drawing Sheets

19,236,518

VARIABLE RELUCTANCE SENSOR WITH OFFSET MAGNETS HAVING IMPROVED MAGNETIC FLUX MEMBER

This patent application is a continuation-in-part patent application of U.S. Ser. No. 07/756,707 filed Sep. 9, 1991, now abandoned.

The present invention generally relates to variable reluctance rotation sensors which generate a high output signal at very low rotational speeds and which are therefore useful in applications where it is desirable to sense low rotational speeds, such as in automotive anti-lock braking systems or traction control systems. More particularly, this invention relates to improved sensors of this type, wherein the improvement is attributable to the annealing process applied to the magnetic flux member within the sensor which increases the magnetic permeability of that flux member.

BACKGROUND OF THE INVENTION

Variable reluctance rotation sensors are employed in applications where rotational speed must be sensed. In automotive applications, these types of sensors are commonly used within anti-lock braking systems and/or traction control systems which require determination of the rotational speed of the automobile wheels. In the past, these variable reluctance sensors have generally operated by measuring the change in the total magnetic flux level of the main flux loop within the sensor.

However, in U.S. Pat. No. 5,023,546 to Pawlak et al and assigned to the assignee of this patent application, a variable reluctance rotation sensor was disclosed which measures the change in the flux distribution rather than the change in the magnetic flux level. This sensor (also referred to as the Pawlak sensor) contains a magnetic toothed wheel which has teeth evenly spaced by slots around its periphery, wherein the magnetic toothed wheel is rotatably supported with respect to a fixed magnetic pickup assembly.

The magnetic pickup assembly consists of two permanent magnets and a magnetic flux member having a multi-turn electrical coil wound thereon, the magnetic flux member being disposed between the two magnets. The assembly extends adjacent to the rotatable toothed wheel to provide flux loops that enclose only some of the coil turns. The pair of permanent magnets each have north and south poles, with the similar pole of each magnet being adjacent the toothed wheel. The permanent magnets are separated from each other circumferentially around the periphery of the toothed wheel by an arc at least equal to the arc between one of the teeth and a non-adjacent slot. Therefore, the permanent magnets are circumferentially spaced so that when one is aligned with a tooth of the wheel, the other is aligned with a non-adjacent slot, i.e., the magnets are off-set. Hence, as the toothed wheel rotates, the two permanent magnets are alternately and opposingly aligned with teeth and slots. The magnetic flux member, which has the multi-turn electrical coil wound thereon, joins the other of the poles of each permanent magnet is a series opposed relationship, and extends between the permanent magnets in close proximity to the toothed wheel to establish separate, oppositely directed flux loops for each of the permanent magnets along the magnetic flux member. The flux loops are spatially determined by the position of the teeth and slots as they rotate adjacent the magnetic flux member between the permanent magnets.

Thus, the flux loops fluctuate circumferentially across the wound coil with the passing of the alternating teeth and slots as the wheel rotates. Correspondingly, an electrical signal is generated in the electrical coil by the variation of flux linkages in individual coil turns as the toothed wheel rotates.

In the Pawlak sensor, because of this off-set configuration of the permanent magnets, the changes in the spatial distribution of the magnetic flux due to the passing teeth and slots in the region between the magnets, with consequent changes in flux linkages to individual coil turns, greatly increase the rate of change in the flux distribution at low rotational speeds. Accordingly, the Pawlak sensor is more sensitive to the magnetic permeability change at these low rotational speeds, as compared to conventional sensors, and thereby exhibits enhanced performance.

However, the magnetic flux member within the Pawlak sensor is generally odd shaped due to the configuration of the sensor and placement of the permanent magnets, and therefore requires considerable machining in order to produce its unique shape. Because of this extensive amount of machining, the machined magnetic flux member is generally highly mechanically stressed. These stresses reduce the magnetic properties of the flux member, in particular its magnetic permeability. This loss in magnetic permeability hinders the sensor of its full sensing potential.

In the past, annealing operations which were designed to alleviate the stresses within the machined magnetic flux member generally provided only limited enhancements to the magnetic permeability of the flux member, resulting in only about a five to ten percent increase in the sensor signal. Such marginal improvements in permeability add little to conventional sensors because they are relatively insensitive to permeability changes, since they measure mostly the change in total flux level and accordingly operate at high magnetomotive forces and high magnetic flux levels. This marginal improvement in permeability to the magnetic circuit is not sufficient to justify the added processing costs associated with annealing of the flux member or the increased time of manufacture for the sensor and are therefore generally not employed.

However, the Pawlak sensor operates differently with its off-set magnets by measuring the change in spatial distribution of the flux through large air gaps along the flux member. Thereby during operation, the magnetomotive force level of the permanent magnets is lower, and the resulting magnetic flux distribution is characterized by lower flux density levels with potentially higher magnetic circuit permeability, as compared to conventional sensors. However, the overall performance of the sensor is more sensitive to the level of magnetic permeability within the magnetic circuit, including the magnetic flux member.

Thus, it would be desirable to provide a means for improving the permeability of the magnetic circuit within the Pawlak sensor, in particular the permeability of the machined magnetic flux member, so as to maximize the sensing capabilities of this variable reluctance sensor having off-set permanent magnets.

SUMMARY OF THE INVENTION

It is an object of this invention to provide a means for improving the magnetic permeability of the magnetic circuit within a variable reluctance sensor having off-set magnets, such as that disclosed in U.S. Pat. No. 5,023,546 to Pawlak et al.

It is a further object of this invention that such a means for improvement in permeability to the magnetic circuit of such a variable reluctance sensor be achieved by a unique annealing process applied to the magnetic flux member.

Lastly, it is still a further object of this invention that such a variable reluctance sensor exhibit enhanced performance when using the improved magnetic flux member which has been annealed in accordance with this invention.

In accordance with a preferred embodiment of this invention, these and other objects and advantages are accomplished as follows.

According to the present invention, there is provided a means for improving the magnetic permeability of a magnetic circuit within a variable reluctance sensor having off-set, permanent magnets by appropriately annealing the magnetic flux member. The variable reluctance sensor includes at least two permanent magnet sources and a magnetic circuit containing a magnetic flux member which connects both magnets, wherein the magnetic flux member may be a rod-shaped member, H-shaped member or any structure which permits an electrically conductive coil to be wound around the structure. The sensor has an off-set toothed exciter wheel arrangement wherein the polarities of both permanent magnets are oriented to be the same towards the toothed exciter wheel and wound coil. An illustrative example of such a variable reluctance sensor is disclosed in the above-described U.S. Pat. No. 5,023,546 to Pawlak et al; however, the teachings of this invention are not limited to that sensor.

The annealing method of this invention improves the permeability of the magnetic circuit incorporating this flux member. With this increase in the permeability of the magnetic circuit, the overall performance of the variable reluctance sensor is enhanced.

The annealing process includes heating the machined magnetic flux member in a vacuum to a temperature and for a duration sufficient to austenitize the magnetic steel material employed in the magnetic flux member. The magnetic flux member is then cooled in the vacuum at a rate sufficiently slow so as to produce coarse grains of pearlite within the microstructure of the magnetic steel. In practice, the flux member is annealed at a temperature of about 1300° F. to about 1550° F. for about 15 to 30 minutes and then cooled at a rate of about 1000° F. per hour to about 800° F.; thereafter, forced argon is employed to cool the flux member to room temperature.

Using this annealing procedure, the magnetic circuit within such a variable reluctance sensor incorporating the annealed magnetic flux member exhibited improved magnetic permeability. Correspondingly, the sensor signal was increased by as much as about 60 percent during operation so as to enhance the overall effectiveness of the sensor, particularly when sensing low rotational speeds such as when employed within anti-lock braking and/or traction control systems.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings wherein.

DETAILED DESCRIPTION OF THE INVENTION

A means for improving the magnetic permeability of the magnetic circuit within a variable reluctance, rotational speed sensor having off-set, permanent magnets is provided by appropriately annealing the magnetic flux member in accordance with the method of this invention.

An illustrative example of the type of variable reluctance sensor that the method of this invention is designed to enhance is disclosed in U.S. Pat. No. 5,023,546 to Pawlak et al, which is incorporated herein by reference. Other sensor configurations may also be employed with an improvement in sensor signal realized, as discussed later.

Figure 1:
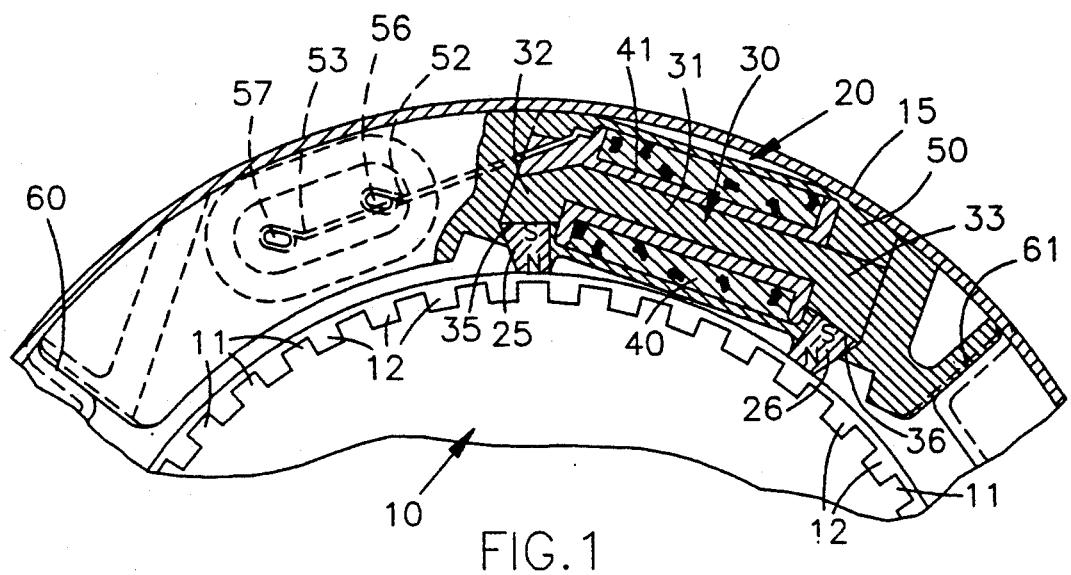
FIG. 1 shows, partly in section, the variable reluctance rotational speed sensor as described in U.S. Pat. No. 5,023,546 to Pawlak et al, having the magnetic flux member annealed in accordance with this invention.

Referring specifically to FIG. 1, which depicts the Pawlak sensor, a toothed wheel 10 is rotatably mounted in, for example, the wheel housing of a vehicle equipped with an anti-lock braking system. The magnetic toothed wheel 10 is engaged for rotation with one of the vehicle road wheels, the rotational speed of which is required. The toothed wheel 10 contains, at its outer peripheral edge, a plurality of rectangular teeth 11 separated by slots 12. Teeth 11 are evenly spaced by slots 12 around the periphery or circumference of the wheel 10 and are substantially identical in size and shape.

The toothed wheel 10 is enclosed with a cover 15 which is also encloses a variable reluctance sensor unit 20 (the Pawlak sensor). The variable reluctance sensor 20 is fixed in a stationary position adjacent the teeth 11 of the wheel 10 so that the teeth 11 and slots 12 of the wheel 10 alternately pass the sensor unit 20 as the wheel 10 rotates.

The variable reluctance sensor 20 contains a pair of permanent magnets 25 and 26, also adjacent the wheel 10. Each of the magnets 25 and 26 has oppositely disposed north and south poles and may be formed from such high magnetic energy product materials as rare earth neodymium or samarium cobalt. The permanent magnets 25 and 26 are shown as trapezoidal in shape, although this shape is not necessary.

The permanent magnets 25 and 26 are oriented with their poles aligned with the wheel 10 so that similar poles of each of the magnets 25 and 26 form air gaps with alternating teeth 11 and slots 12 of the wheel 10 as the wheel 10 rotates. For example, as shown, both of the magnets 25 and 26 have north poles adjacent the wheel 10. The magnets 25 and 26 are spaced circumferentially around the periphery of the wheel 10 by an arc equal to that between a tooth and a non-adjacent slot, so that when one of the magnets 25 and 26 is adjacent a tooth of the wheel 10, the other is adjacent a slot with at least one other tooth between the magnets 25 and 26. In the preferred embodiment shown, there will be several teeth between the magnets, as seen with the teeth 11b, 11c and 11d in FIG. 2, and these teeth will concentrate the flux and thus help cause the flux loops to fluctuate circumferentially as the wheel 10 rotates.

The variable reluctance sensor unit 20 further contains a magnetic flux member 30 which consists of a cylindrical long straight portion 31 with a pair of short trapezoidal or rectangular pole portions 32 and 33 that are perpendicular to the straight portion 31 at its two ends. The pole portion 32 has a slanted end surface 35 to which the sound pole of the permanent magnet 25 is affixed, the slant of the surface providing the required radial orientation of the magnet 25 relative to the wheel 10. Similarly, the pole portion 33 has a slanted end surface 36 to which the south pole of the magnet 26 is affixed to provide the required radial orientation of the magnet 26 relative to the wheel 10. The straight portion 31 of the flux member 30 extends adjacent the wheel 10 between the permanent magnets 25 and 26.

The magnetic flux member 30 is made of a magnetic material such as an appropriate magnetic steel, preferably American Iron and Steel Institute (AISI) 1214 or 12L14 (the L indicating the addition of lead for enhanced machinability) magnetic steel, although other suitable magnetic materials could be used such as other magnetic steels like low carbon steel AISI 1008, or other rephosphorized and resulphurized carbon steel grades like the AISI 1214 steel; however, this would require modification of the annealing method of this invention. The AISI 12L14 magnetic steel is characterized by a nominal chemical composition in weight percents of about 0.06 percent carbon, 0.99 percent manganese, 0.06 phosphorus, 0.277 percent sulfur and 0.01 percent silicon, as well as about 0.25 percent lead for enhanced machinability, although this is not necessary for obtaining the magnetic properties of this invention, with the balance being iron. Generally, the composition of the AISI 12L14 magnetic material could vary from about 0.04 to about 0.1 percent carbon, about 0.5 to about 1.5 percent manganese, up to about 0.1 percent phosphorus, up to about 0.5 percent sulfur, up to about 0.1 percent silicon, and from about 0.15 to about 0.35 percent lead (although not necessary), with the balance being iron which may contain certain normal levels of impurities.

Figure 2:
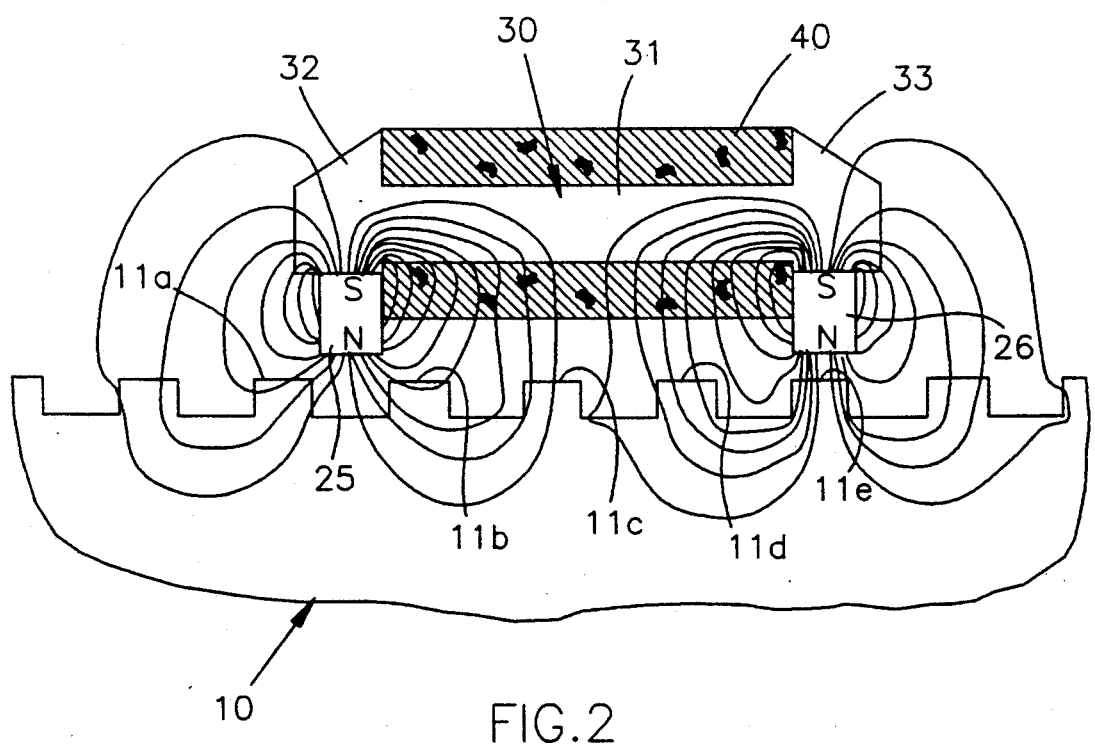
FIG. 2 shows a schematic view of the sensor of FIG. 1, including a set of magnetic flux lines associated with the off-set magnets, so as to demonstrate the flux pattern.

As is apparent from the description and accompanying FIGS. 1 and 2, the magnetic flux member 30 is characterized by a complex shape, with its cylindrical straight portion 31 and short trapezoidal or rectangular pole portions 32 and 33 that are perpendicular to the straight portion 31 at its two ends.

The operation of the variable reluctance sensor 20 is as follows. The arrangement of the pole of the magnets 25 and 26 is in series opposing relationship. Thus, no common main magnetic flux loop is established through both magnets. Rather, each of the magnets 25 and 26 establishes its own separate flux loops, as shown in FIG. 2. For each magnet, a large percentage of the flux is contained in loops which can be traced from the south pole of the magnet through part of the straight portion 31 of the flux member 30, across a large air gap to the wheel 10, and back through the wheel 10 and a smaller air gap to the north pole of the magnet. This arrangement provides the most flux available for spatial distributional changes as the wheel 10 rotates. The rotation of the wheel 10 produces circumferential fluctuation of the flux loops in the region between the magnets 25 and 26.

A coil of insulated, electrically conductive wire is wound on a spool 41 around the flux member 30. The coil 40 extends over substantially the entire length of the flux member 30 as to be crossed by the maximum flux loops between the magnets 25 and 26. With the flux distributed circumferentially across the coil 40 and fluctuating circumferentially as the wheel 10 rotates, the flux linkages of the coil 40 are varied to generate a sinusoidal voltage therein. The output signal of the coil 40 is generated across a pair of output leads 52 and 53 which are connected to corresponding leads of the coil 40. The current from the coil 40 is provided to the outside environment through the pair of leads 52 and 53 that are connected to opposite ends of the coil within the housing 50 and having portions projecting out of the housing 50 for electrical contact with the terminals 56 and 57, respectively, which provide the signal outside the cover 15.

As stated previously, the magnetic flux member 30 is characterized by a complex configuration and is generally formed by machining. It is believed that the extensive machining required induces excessive mechanical stresses within the flux member 30. It has been determined that the magnetic permeability of the magnetic circuit of the variable reluctance speed sensor 20 can be enhanced by annealing the magnetic flux member 30 as follows.

The preferred annealing process includes heating the machined magnetic flux member 30 formed from the AISI 12L14 magnetic steel material in a vacuum (or other suitable protective atmosphere) to a temperature and for a duration sufficient to fully austenitize the magnetic steel so that full carbide solution is obtained. In practice, the magnetic flux member 30 of the Pawlak sensor was heated to a temperature of about 1300° F. for a minimum of about 15 minutes, but not longer than about 30 minutes. It is foreseeable that the annealing temperature could vary between about 1300° F. and about 1550° F., possibly even between about 1250° F. and 1600° F. The lower temperatures are preferred, though, so as to maximize the dimensional stability of the flux member 30; however, suitable results have been obtained at the higher temperatures with other configurations, as discussed more fully later. The duration of about 15 minutes is required so as to completely put into solution the carbides and austenitize the steel. A maximum duration of about 30 minutes is preferred since periods longer than this are not necessary and only serve to distort the component. However, it is foreseeable that suitable results could also be obtained at durations which are outside of the preferred range, such as up to a few hours, although they would not optimize the results of this invention.

The magnetic flux member 30 was then cooled in the vacuum at a rate sufficiently slow so as to avoid the formation of hard martensite without the resultant steel microstructure. Therefore, the resultant magnetic steel is characterized by relative softness. In practice, the rate of cooling was about 100° F. per hour, with a range of cooling rates from about 50° F. per hour to about 150° F. per hour being acceptable. The use of a cooling rate of about 100° F. per hour was chosen because of its effectiveness, coupled with its being most practical during the manufacturing operations. The parts were cooled at this slow rate to about 800° F., and then cooled below this temperature to room temperature by introducing argon gas into the vacuum chamber. The rate of cooling below about 800° F. does not appear to be critical to the success of this invention.

It has been determined that the annealing method of this invention sufficiently eliminates the internal mechanical stresses within the machined magnetic flux member 30, thereby improving its magnetic permeance and correspondingly enhancing the permeability of the magnetic circuit incorporating the flux member 30 and permanent magnets 25 and 26.

It should also be noted that although the advantages associated with the annealing method of this invention are most apparent when the flux member 30 is machined, it is a foreseeable that the flux member 30 could be made by other techniques such as casting, whereupon this method could be used but with less dramatic improvements realized.

Figure 3:
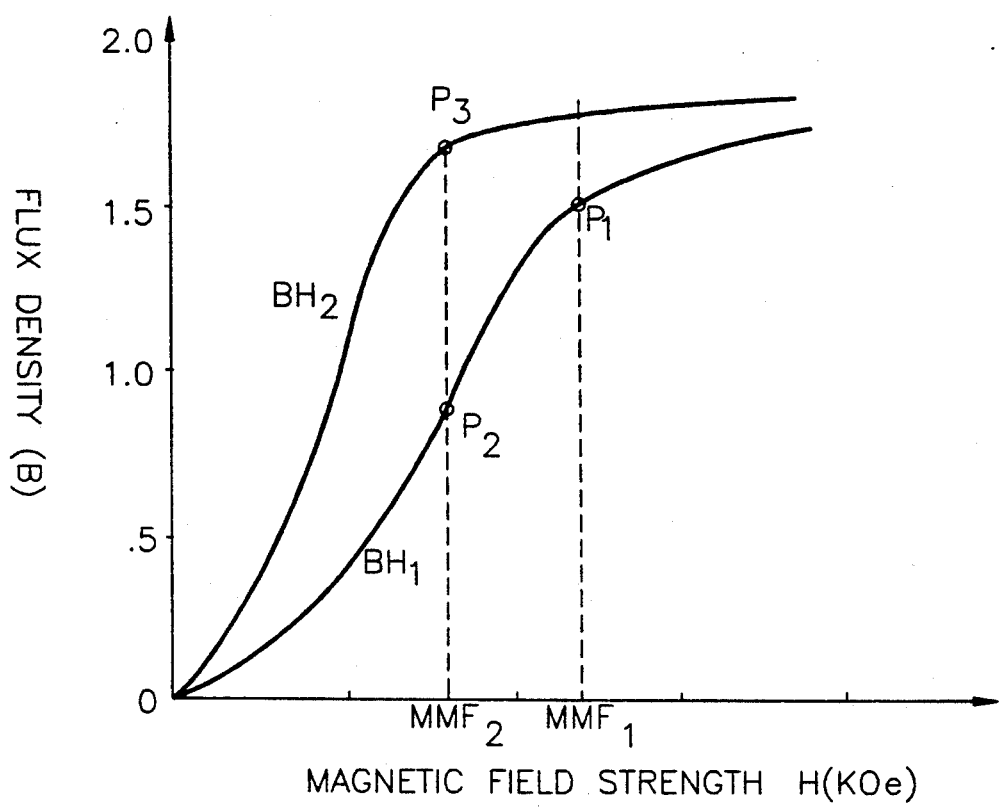
FIG. 3 shows the relative magnetic operating points for two Pawlak sensors, including one which had a magnetic circuit employing a flux member that has been annealed in accordance with this invention.

Shown in FIG. 3 is the relative magnetic operating points for two Pawlak sensor units 20 depicted in FIGS. 1 and 2. One of the sensor units 20, represented by the magnetization curve $BH_1$, contained a magnetic circuit having a conventional as-machined flux member 30. The other sensor 20, represented by magnetization curve $BH_2$, contained a magnetic circuit employing a flux member 30 that had been annealed in accordance with the method of this invention.

The magnetic operating point is defined as the intersection of the relative magnetic flux density (B) during operation and the magnetic field strength (H) in units of kiloOersteds (KOe). The magnetic flux density (B) is defined as the number of lines of magnetic flux per unit area, which are perpendicular to the direction of the flux. As depicted in FIG. 2, within the closed magnetic circuit, when the magnetic flux member 30 is magnetized by current flowing in the windings of the wound coil, magnetic lines of force are generated which are designated as magnetic flux. The total magnetic flux in the flux member 30 is divided by the cross-sectional area of the flux member 30 to result in the flux density (B). The magnetic field strength (H) is defined as the magnetomotive force developed by the permanent magnets 25 and 26 per the length in the magnetization direction. The magnetomotive force is defined as the force which tends to produce a magnetic field. This force, when generated by the permanent magnets 25 and 26 (as in the Pawlak sensor 20), is proportional to the permanent magnet material coercive force ($H_c$) and its length along the magnetization.

In FIG. 3, the operating point $P_1$ indicates the flux density (B) level and magnetic circuit permeability of the flux member 30 before annealing. Magnetic permeability is the ease with which the magnetic lines of force can pass through a substance magnetized with a given magnetizing force. Quantitatively, it is expressed as the ratio between the magnetic flux density (B) produced and the magnetic field strength, or magnetizing force, (H). Therefore, for a given magnetizing force, i.e., $MMF_2$, a higher operating point corresponds to a higher magnetic permeability.

The annealing process of this invention enhances the magnetic permeability of the flux member 30 as indicated by the energy product line represented by $BH_2$ as compared to the non-annealed flux member 30 represented by energy product line $BH_1$. It can be seen that for conventional sensors which operate at high magnetomotive force levels ($MMF_1$), there is a relatively small change in flux density (B) level of the magnetic circuit associated with the annealing process.

However, in the Pawlak sensor 20 described above, the magnetomotive force ($MMF_2$) level for the permanent magnets 25 and 26 is significantly lower as compared to the conventional magnets because it directs the flux over large air gaps to achieve favorable spatial distribution. As shown, with the new annealing method of this invention, the flux level increase to operating point $P_3$ after annealing is substantial as compared to the operating point $P_2$ at the same magnetomotive force level for a conventional non-annealed flux member.

In addition, improved permeability is observed using the annealed magnetic flux member 30 of this invention. The improved permeability was determined by measuring the inductance of the wound coil which is proportional to the permeance of the magnetic circuit. With the as-machined non-annealed flux member, represented by operating point $P_2$, the inductance was 720 milliHenry, while the inductance for the as-annealed flux member 30 represented by operating point $P_3$ was approximately 963 milliHenry. This is an improvement of about 33 percent in inductance representing a comparable improvement in permeability of the magnetic flux member 30, when employing the annealing process of this invention.

Figure 4:
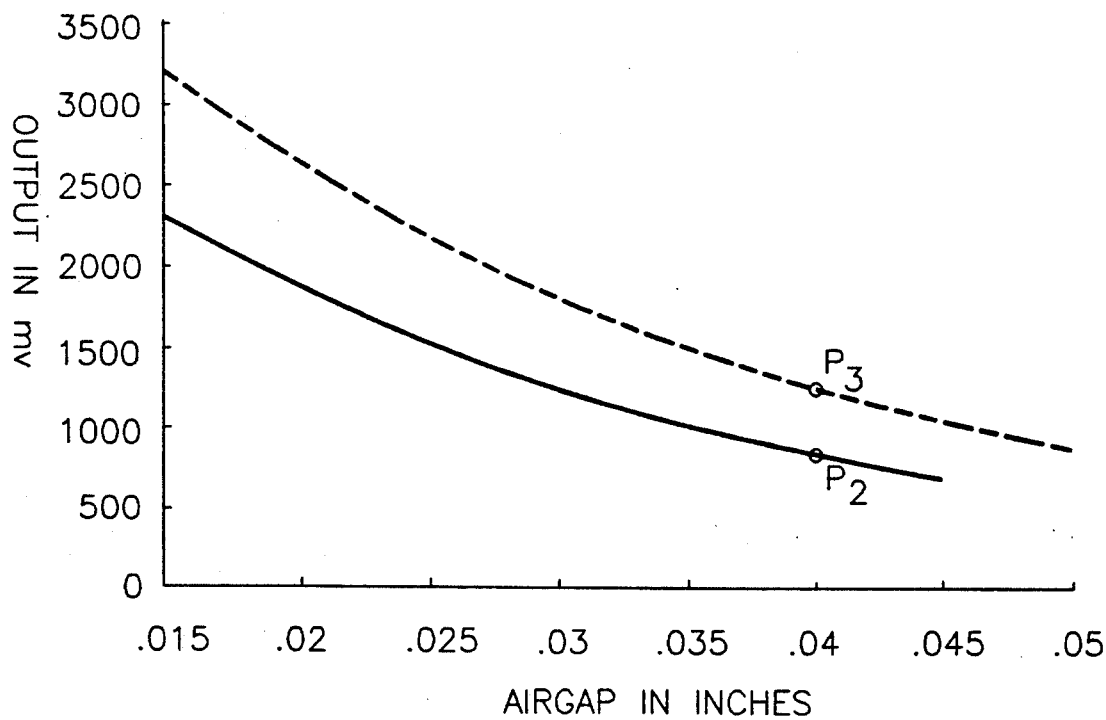
FIG. 4 shows the relative output voltages for the two Pawlak sensors operating at the levels invention.

As shown in FIG. 4, sensor output voltages are represented for the Pawlak sensor 20 operating with a flux member 30 which has been annealed in accordance with this invention ($P_3$) and an as-machined non-annealed flux member ($P_2$). For an air gap of 0.04 inches, the signal level for the as-machined, non-annealed flux member was approximately 750 millivolts, while the signal level for the as-annealed flux member 30 was approximately 1166 millivolts. The sensor 20 signal was improved substantially, about 56 percent, with the flux member 30 which had been annealed in accordance with this invention as compared to the conventional as-machined sensor. Further, the uniformity of the signal output was also enhanced with the method of this invention.

Figure 5:
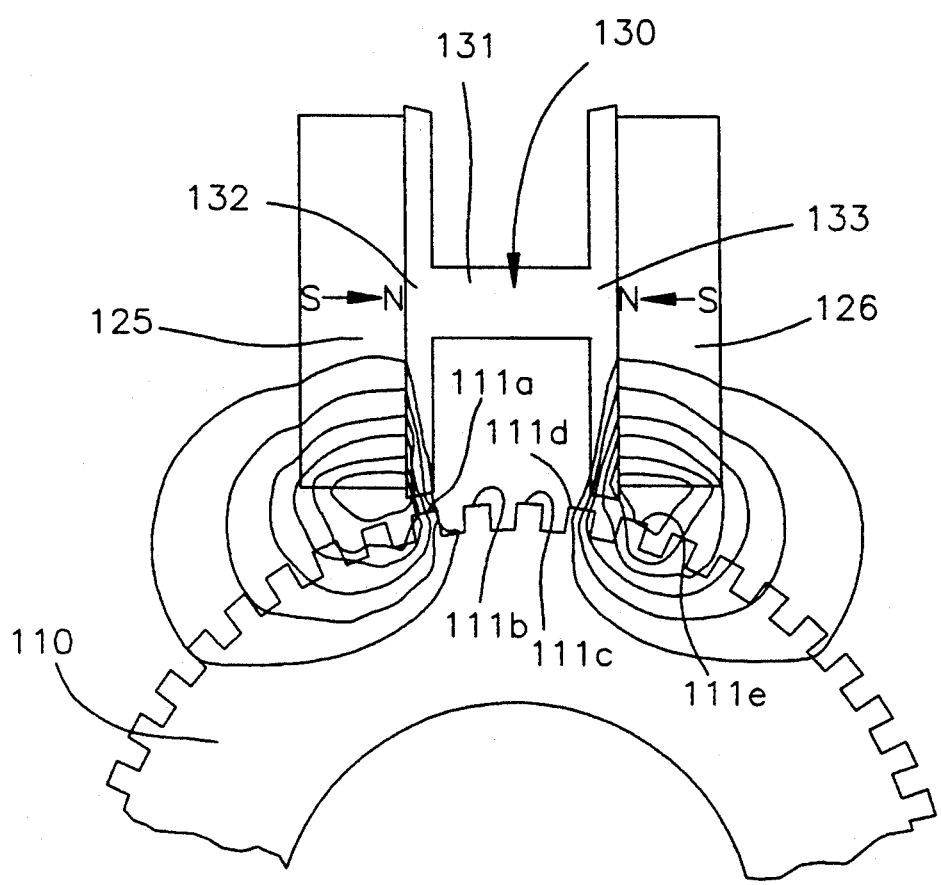
FIG. 5 shows a schematic view of an alternative type of variable reluctance sensor which incorporates an H-shaped magnetic flux member, including a set of magnetic flux lines associated with the off-set magnets, so as to demonstrate the flux pattern which can be annealed in accordance with this invention with significant improvements in the magnetic permeability and corresponding sensor signal obtained.

An alternative embodiment of a variable reluctance sensor which exhibits enhanced magnetic permeance and corresponding sensor signal, as a result ob being thermally treated in accordance with this invention, is shown in FIG. 5. This alternative embodiment employs an H-shaped magnetic flux member 130 and a slightly different orientation of the permanent magnets 125 and 126, as compared to the previously described Pawlak sensor; however, the operation of the sensor, as well as the improved properties as a result of the teachings of this invention, are analogous to the previously described Pawlak sensor.

Again, the variable reluctance sensor is fixed in a stationary position adjacent the teeth 111 of the wheel 110 so that the teeth 111 and slots of the wheel 110 alternately pass the sensor unit as the wheel 110 rotates. The variable reluctance sensor contains a pair of rectangular permanent magnets 125 and 126, also adjacent the wheel 110. Each of the magnets 125 and 126 has oppositely disposed north and south poles and may be formed from such high magnetic energy product materials as rare earth neodymium or samarium cobalt.

The permanent magnets 125 and 126 are oriented with their poles aligned with the H-shaped magnetic flux member 130 and wheel 110, so that similar poles of each of the magnets 125 and 126 form air gaps with alternating teeth 111 and slots of the wheel 110 as the wheel 110 rotates. For example, as shown, both of the magnets 125 and 126 have north poles adjacent the H-shaped magnetic flux member 130. The magnets 125 and 126 are spaced circumferentially around the periphery of the wheel 110 in an off-set arrangement, so that when one of the magnets 125 and 126 is adjacent a tooth of the wheel 110, the other is adjacent a slot with at least one other tooth between the magnets 125 and 126. In the embodiment shown, there are several teeth 111$b$, 111$c$ and 111$d$ between the magnets. These teeth 111$b$, 111$c$ and 111$d$ will concentrate the flux and thus help cause the flux loops to fluctuate circumferentially as the wheel 110 rotates.

As shown, the sensor unit contains the H-shaped magnetic flux member 130, made from the previously described AISI 1214 or 12L14 magnetic steel, although other suitable magnetic materials may be used. The magnetic flux member 130 consists of a cylindrical long straight pole piece 131 with a pair of rectangular pole portions 132 and 131 that are perpendicular to the straight portion 131 at its two ends. The pole portions 132 and 133 have slightly slanted end surfaces adjacent the toothed wheel 110, so as to provide the required radial orientation of the magnets 125 and 126 relative to the wheel 110.

The operation of the variable reluctance sensor is essentially identical to the Pawlak sensor. Because the arrangement of the pole of the magnets 125 and 126 is in series opposing relationship, no common main magnetic flux loop is established through both magnets 125 and 126. Rather, each of the magnets 125 and 126 establishes its own separate flux loops, as shown in FIG. 5, and tends to provide the most flux available for spatial distributional changes as the wheel 110 rotates. The rotation of the wheel 110 produces circumferential fluctuation of the flux loops in the region between the magnets 125 and 126.

A coil of insulated, electrically conductive wire (not shown) is wound around the straight portion 131 of the flux member 130. The coil is crossed by the maximum flux loops between the magnets 125 and 126, and with the flux distributed and fluctuating circumferentially across the coil as the wheel 110 rotates, the flux linkages of the coil generate a sinusoidal voltage therein. The output signal of the coil is then appropriately provided to the outside environment.

By annealing the magnetic flux member 130 in accordance with this invention, the magnetic permeability of the magnetic circuit of the variable reluctance speed sensor is significantly enhanced. With the H-shaped magnetic flux member, the preferred annealing process included heating the magnetic flux member 130 in a vacuum to a temperature of about 1550° F., for a minimum of about 30 minutes. This higher temperature and longer duration are preferred, as compared to the annealing method for the above-described Pawlak sensor, since dimensional changes produced by the annealing are not as great a possibility with the H-shaped member 130, yet it ensures complete solutionizing of the carbides and austenitizing of the steel.

The magnetic flux member 130 was then cooled in the vacuum at a rate sufficiently slow so as to avoid the formation of hard martensite within the resultant steel microstructure, about 100° F. per hour, to a temperature of about 800° F., and then cooled below this temperature to room temperature by introducing argon gas into the vacuum chamber.

It has been determined that the annealing method of this invention significantly improves the magnetic permeance of the magnetic flux member 130 and correspondingly enhances the permeability of the magnetic circuit incorporating the flux member 130 and permanent magnets 125 and 126. The results is a faster saturation of the pole piece 131 by the flux level, thereby causing increased penetration of the flux in the coil area.

Operating points for two of these H-shaped sensor units depicted in FIG. 5 were determined for identical operating air gaps between the sensor and toothed wheel 110. One of the sensor units contained a magnetic circuit having a conventional as-machined flux member 130. The other sensor contained a magnetic circuit employing a flux member 130 that had been annealed in accordance with the method of this invention. The signal level for the as-machined, non-annealed flux member was approximately 692 millivolts, while the signal level for the as-annealed flux member 130 was approximately 1126 millivolts, about a 62 percent improvement in sensor signal level. Further, as noticed with the Pawlak sensor, the uniformity of the signal output was also enhanced with the method of this invention.

In addition, improved permeability, as determined by measuring the inductance of the wound coil, was observed using the annealed magnetic flux member 130 of this invention. With the as-machined non-annealed flux member, the inductance was about 3.65 Henry, while the inductance for the as-annealed flux member 130 was approximately 5.24 Henry, for the same magnetomotive force level. This is an improvement of about 44 percent in inductance, representing a comparable improvement in permeability of the magnetic flux member 130 when employing the annealing process of this invention.

The annealing process of this invention again resulted in an enhancement of the magnetic permeability of the flux member 130 within the magnetic circuit of this type of variable reluctance sensor having an H-shaped magnetic flux member 130.

It is to be noted that while the annealing method of this invention substantially improves the sensor output and permeability of the magnetic flux member 30 and 130, the teachings of this invention could be employed in alternative sensors.

Particularly, it is believed that the teachings of this invention could be extended to any type of configuration of variable reluctance sensor having the following features, with a significant increase in sensor signal output expected. First, the sensor must have at least two permanent magnet sources. Although the two embodiments described herein contained only two permanent magnets, it is foreseeable that a plurality of magnets could be used. Secondly, a magnetic circuit must be provided to connect both (or all) magnet sources. This can be a rod-shaped member or H-shaped member as described herein, or any structure which connects the magnets and which permits the winding of an electrically conductive coil around itself. Further, the arrangement of the magnets relative to the teeth of the wheel must be alternated and opposed, i.e., the on-off relationship described herein. This permits operating points at much lower magnetomotive forces, which is where the drastic improvements in sensor signal outputs are realized with the teachings of this invention. It is foreseeable that an on-off arrangement is not necessary; however, the drastic improvements in signal outputs would not be realized. Lastly, the polarities of the magnet sources must be oriented similarly towards the exciter wheel and coil. This results in the polarities being magnetically non-supportive, which results in the separation of the magnetic flux patterns.

In addition, the teachings of this invention could be employed to thermally anneal flux members which are used in more conventional variable reluctance sensors; however, it is believed that the improvements would not be as dramatic.

Therefore, while out invention has been described in terms of a preferred embodiment, it is apparent that other forms could be adopted by one skilled in the art, for example by modifying the processing parameters such as the temperatures or durations employed, or by substituting appropriate magnetic materials, or by utilizing the particular material and annealing method in an alternative environment such as another variable reluctance sensor which does mot incorporate the off-set permanent magnet arrangement. Accordingly, the scope of out invention is to be limited only by the following claims.

The embodiments of the invention in which an exclusive property or privilege is claimed are defined as follows:

1. In a method for forming a variable reluctance rotation sensor having a magnetic toothed wheel with teeth evenly spaced by slots around the periphery thereof and being rotatably supported with respect to a fixed magnetic pickup assembly, said fixed magnetic pickup assembly comprising, in combination:

a pair of permanent magnets each having a pair of poles, said permanent magnets being separated from each other circumferentially around the periphery of the toothed wheel by an arc equal to the arc between one of the teeth and a non-adjacent slot, whereby the fields of said first and second permanent magnets are alternately and opposingly aligned with teeth and slots as the toothed wheel rotates;

a magnetic flux member made from a magnetic steel having a carbon content of about 0.04 to about 0.1 weight percent and having a multi-turn electrical coil wound thereon, said magnetic flux member extending between and engaging said first and second permanent magnets in series magnetically opposed relationship and extending between said permanent magnets in proximity to the toothed wheel to hold said electrical coil tangentially in close proximity thereto; and each of said magnets having the same poles oriented similarly towards the toothed wheel and said wound multi-turn electrical coil, said method comprising machining to shape a said flux member from a said steel so as to position the permanent magnets in proximity to the toothed wheel, the improvement in said method comprising:

heating said machined magnetic flux member, prior to the winding of said electrical coil thereon, in a protective atmosphere to a temperature and for a duration sufficient to austenitize said magnetic steel so that essentially a full carbide solution is obtained; and then cooling said magnetic flux member in said protective atmosphere at a rate sufficient to minimize martensite formation within said magnetic steel such that said magnetic flux member is characterized by a coarse pearlite microstructure and improved magnetic permeance, and correspondingly said variable reluctance sensor exhibits an increased magnetic flux density when said permanent magnets operate at a given magnetomotive operating force.

2. A method for forming a variable reluctance rotation sensor as recited in claim 1 wherein said magnetic flux member is heated to a temperature of about 1300° F. to about 1550° F. during said heating step.

3. A method for forming a variable reluctance rotation sensor as recited in claim 1 wherein said magnetic flux member is cooled at a rate of about 50° F. per hour to about 150° F. per hour during said cooling step.

4. A method for forming a variable reluctance rotation sensor as recited in claim 1 wherein said magnetic steel comprises about 0.04 to about 0.1 percent carbon, about 0.5 to about 1.5 percent manganese, up to about 0.1 percent phosphorus, up to about 0.5 percent sulfur and up to about 0.1 percent silicon, with the balance being essentially iron.

5. A method for forming a variable reluctance rotation sensor as recited in claim 1 wherein each of said permanent magnets has a common pole adjacent the toothed wheel and said magnetic flux member is heated to a temperature of about 1300° F. to about 1350° F. during said heating step.

6. A method for forming a variable reluctance rotation sensor as recited in claim 1 wherein said magnetic flux member joins a common pole of said first and second permanent magnets and said magnetic flux member is heated to a temperature of about 1500° F. to about 1550° F. during said heating step.

7. A method for forming a magnetic flux member suitable for use in a variable reluctance rotation sensor comprising the following steps:

machining a magnetic flux member from a magnetic steel having about 0.04 to about 0.1 percent carbon;

heating said magnetic flux member in a vacuum to a temperature of about 1300° F. to about 1550° F. and for a duration sufficient to austenitize said magnetic steel so that essentially a full carbide solution is obtained; and then cooling said magnetic flux member in said vacuum at a rate of about 50° F. per hour to about 150° F. per hour sufficient to minimize martensite formation within said magnetic steel;

such that said magnetic flux member is characterized by primarily a coarse pearlite microstructure and enhanced magnetic permeance so as to be suitable for use in a closed magnetic circuit within a variable reluctance sensor, said magnetic circuit being capable of operating at an increased flux density for a given magnetomotive operating force within said magnetic circuit.

* * * * *